United States Patent [19]
Fujita et al.

[11] Patent Number: 5,370,016
[45] Date of Patent: Dec. 6, 1994

[54] SPEED CHANGE CONTROL APPARATUS AND METHOD OF AN AUTOMOTIVE AUTOMATIC TRANSMISSION

[75] Inventors: Kenjiro Fujita, Kusatsu; Katsutoshi Usuki, Kyoto; Katsuhiro Hatta, Uji; Takeo Hiramatsu, Nagaokakyo, all of Japan

[73] Assignee: Mitsubishi Jidosha Kogyo Kabushiki Kaisha, Tokyo, Japan

[21] Appl. No.: 44,488

[22] Filed: Apr. 9, 1993

[30] Foreign Application Priority Data

Apr. 10, 1992 [JP] Japan ................... 4-90970

[51] Int. Cl.$^5$ .................................. F16H 59/00
[52] U.S. Cl. ................... 74/336 R; 364/424.1
[58] Field of Search ................... 74/866, 366 R; 364/424.1

[56] References Cited

U.S. PATENT DOCUMENTS

| | | | |
|---|---|---|---|
| 4,603,596 | 8/1986 | Akashi et al. | 74/336 R |
| 4,989,477 | 2/1991 | Hunter et al. | |
| 5,097,726 | 3/1992 | Asada | 74/336 R |
| 5,109,721 | 5/1992 | Boardman et al. | 74/336 R |
| 5,117,710 | 6/1992 | Asano et al. | 74/336 R |
| 5,157,991 | 10/1992 | Sumimoto | 74/866 |
| 5,186,291 | 2/1993 | Hedstrom et al. | 74/336 R |
| 5,189,931 | 3/1993 | Suzuki | 364/424.1 |
| 5,233,523 | 8/1993 | Follmer | 364/424.1 |
| 5,251,513 | 10/1993 | Asada | 74/866 |
| 5,261,298 | 11/1993 | Markyvech | 73/866 |

FOREIGN PATENT DOCUMENTS

| | | |
|---|---|---|
| 2274838 | 1/1976 | France . |
| 2433137 | 3/1980 | France . |
| 1489019 | 10/1977 | United Kingdom . |
| 2030245 | 4/1980 | United Kingdom . |

*Primary Examiner*—John T. Kwon

[57] ABSTRACT

A speed change control and apparatus of an automotive automatic transmission causes a turbine rotational speed to change toward a synchronous rotational speed associated with a desired gear stage by engaging a connection-side clutch while disengaging a release-side clutch, to thereby carry out gear-changing. To reduce a speed change shock, a speed change time is rendered stabilized irrespective of vehicle running state, by carrying out feedback control such that the time-dependent change rate (Ns)' of a rotational speed difference between clutch plates and clutch discs of the connection-side clutch becomes equal to a target slip rotational speed change rate (Ni)'.

12 Claims, 7 Drawing Sheets

1

SPEED CHANGE CONTROL APPARATUS AND METHOD OF AN AUTOMOTIVE AUTOMATIC TRANSMISSION

BACKGROUND OF THE INVENTION

The present invention relates to a speed change control and apparatus of an automatic transmission for motor vehicles.

Automatic transmissions installed in motor vehicles comprise a plurality of frictional engaging elements, such as hydraulic multiple disc clutches and hydraulic brakes. To carry a shift change or gear-changing operation, these clutches and brakes are selectively rendered operative. That is, engagement of one of the elements is released while a different element is engaged.

When upshift from the first speed to the second speed, for instance, is effected in an automatic transmission, the engagement of a clutch for establishing the first speed is released, while a clutch for establishing the second speed is engaged. This thereby carries out changeover of clutch connection such that a change rate (Nt)' of the rotational speed of an input shaft of the automatic transmission, i.e., the rotational speed change rate of a turbine of a torque converter, decreases along a target change rate. In this case, the turbine rotational speed Nt decreases from a first-speed synchronous rotational speed N1 to reach a second-speed synchronous rotational speed N2. This occurs both when a vehicle is in a constant-speed running state, and when it is in an accelerative running state, as shown in FIG. 10.

On the other hand, when downshift from second to first is effected, the engagement of the clutch for establishing the second speed is released and the clutch for establishing the first speed is engaged. This thereby carries out changeover of clutch connection such that a change rate (Nt)' of the rotational speed Nt of the turbine increases along a target change rate. In this case, the turbine rotational speed Nt increases from the second-speed synchronous rotational speed N2 to the first-speed synchronous rotational speed N1 both when the vehicle is in a constant-speed running state and when it is in a decelerative running state.

Meanwhile, as shown in FIGS. 10 and 11, the first- and second-speed synchronous rotational speeds N1 and N2 increase when the vehicle is in an accelerative state (FIG. 10), and decrease when the vehicle is in a decelerative state (FIG. 11), although these speeds are maintained substantially at constant when the vehicle runs at a constant speed.

According to the aforementioned conventional speed change method, however, when the clutch connection is changed over, the changeover is carried out in such a manner that the change rate (Nt)' of the turbine rotational speed Nt becomes equal to a predetermined target change rate. As a result, a time period (speed change time) required for the turbine rotational speed Nt to change from one at the start of speed change, to an associated one of the synchronous rotational speed changes in dependence of a vehicle running state. (The speed change time decreases by Δ Tu and Δ Td in FIGS. 10 and 11, respectively, as compared with a case wherein the vehicle runs at constant speed).

Thus, in the case of upshift during the accelerative running state of the vehicle, for instance, the synchronous rotational speed N2 increases toward the decreasing turbine rotational speed Nt. As a result, the speed change time becomes short, so that the turbine rotational speed Nt is suddenly synchronized with the synchronous rotational speed N2. This causes a problem such that a great speed change shock occurs. In the case of downshift during the decelerative running state, wherein the synchronous rotational speed N1 decreases toward the increasing turbine rotational speed Nt, the speed change time also becomes short, as in the case of the aforesaid upshift. This causes the turbine rotational speed Nt to be suddenly synchronized with the synchronous rotational speed N1. Thus, the problem of a great speed change shock is presented.

OBJECTS AND SUMMARY OF THE INVENTION

The present invention was created to solve the above-described problems, and an object thereof is to provide a speed change control and apparatus for an automotive automatic transmission, which method and apparatus are capable of making the aforesaid speed change time substantially constant, irrespective of vehicle running state.

According to the present invention, there is provided a speed change control and apparatus which are applied to an automotive automatic transmission. The automatic transmission includes a first frictional engaging element for establishing a first gear stage, a second frictional engaging element for establishing a second gear stage, a first electromagnetic valve for controlling an operating oil pressure supplied to the first frictional engaging element, and a second electromagnetic valve for controlling an operating oil pressure supplied to the second frictional engaging element. In this and apparatus', the first and second electromagnetic valves are controlled such that the first frictional engaging element having been engaged is released and the second frictional engaging element having been released is engaged, to carry out gear-changing from the first gear stage to the second gear stage.

This speed change control method comprises the steps of: detecting a rotational speed of an input shaft of the automatic transmission; detecting a rotational speed of an output shaft of the automatic transmission; detecting, as a slip rotational speed change rate, a difference between a change rate of the input shaft rotational speed and a product, which is calculated by multiplying a change rate of the output shaft rotational speed by a gear ratio associated with the second gear stage; and carrying out feedback control of the second electromagnetic valve such that the slip rotational speed change rate becomes equal to a target value.

Preferably, the speed change control method further includes the steps of: detecting, as an asynchronous point, a time point at which the input shaft rotational speed of tile automatic transmission starts to be deviated from a rotational speed corresponding to the first gear stage; detecting, as a synchronous point, a time point at which the input shaft rotational speed has reached a rotational speed to be achieved in the second gear stage; and carrying out the feedback control from the asynchronous point to the synchronous point.

More preferably, the speed change control method further includes the steps of: detecting, as a first product, a product of the output shaft rotational speed and a gear ratio associated with the first gear stage; detecting, as a second product, a product of the output shaft rotational speed and the gear ratio associated with the second gear stage; detecting, as the asynchronous point, a time point at which a difference between the input shaft rotational speed and the first product becomes greater than a predetermined value; and detecting, as the synchronous point, a time point at which a difference between the input shaft rotational speed and the second product becomes equal to or less (at most equal to) than a predetermined value. Further, an initial duty factor with which the second electromagnetic valve is driven is set when the asynchronous point is detected, and is corrected in accordance with a difference between the slip rotational speed change rate and the target value.

Preferably, the target value for each of speed change modes of the automatic transmission is set, and is corrected in accordance with a running state of the vehicle.

The present invention is advantageous in that the input shaft rotational speed is changed toward the synchronous rotational speed associated with a desired gear stage such that the time-dependent change rate of the difference in rotational speed between an engaging member and an engaged member of the second frictional engaging element becomes equal to the target slip rotational speed change rate, to thereby make a speed change time, i.e., a time period from the start of speed change to the time point at which the input shaft rotational speed is synchronized with the synchronous rotational speed associated with the desired gear stage, substantially constant, regardless of a change in the synchronous rotational speed caused by accelerative or decelerative vehicle running. As a result, the speed change time is maintained approximately constant irrespective of vehicle running state, whereby a reduction in speed change shock is achieved.

These and other objects and advantages will become more readily apparent from an understanding of the preferred embodiment described below with reference to the following drawing figures.

BRIEF DESCRIPTION OF THE DRAWINGS

The invention will become more fully understood from the detailed description herein below with reference to the accompanying figures, given by way of illustration only and not intended to limit the present invention in which.

DETAILED DESCRIPTION OF THE INVENTION

Figure 1:
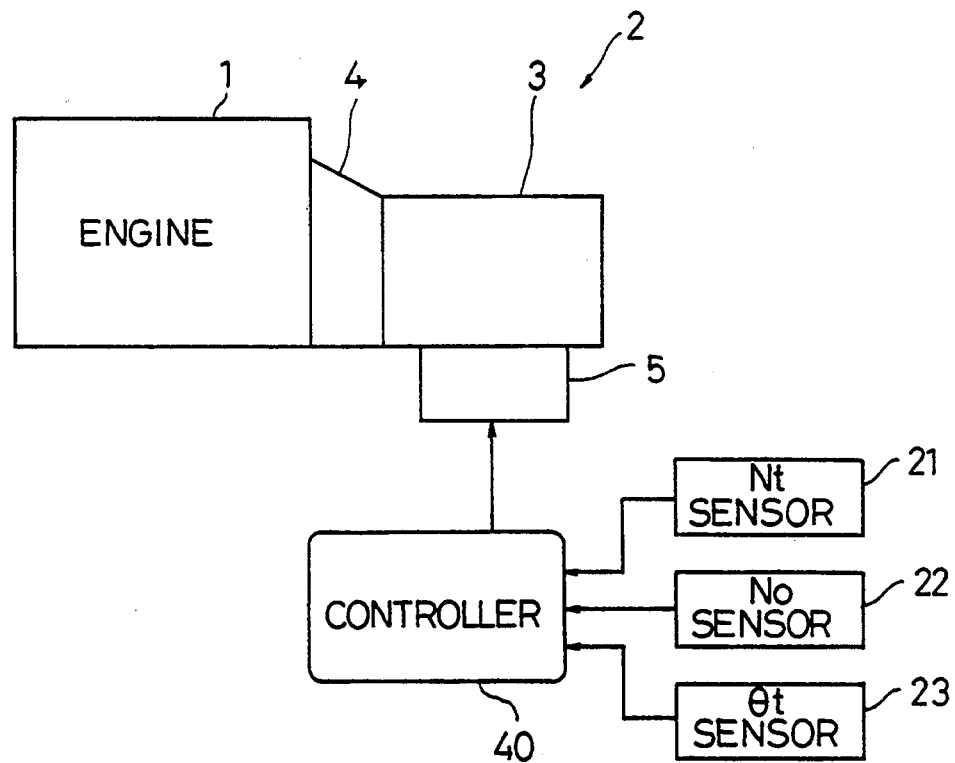
FIG. 1 is a schematic view showing the arrangement of an automotive automatic transmission for embodying a speed change method according to the present invention.

FIG. 1 illustrates a schematic arrangement of an automotive automatic transmission to which a speed change control method and apparatus according to the present invention is applied. In the figure, reference numeral 1 denotes an internal combustion engine, the output of which is transmitted to drive wheels (not shown) through an automatic transmission 2.

The automatic transmission 2 comprises a torque converter 4, a gear transmission 3, a hydraulic circuit 5, a controller 40. and other elements. The gear transmission 3 includes a gear train of, e.g., a four-forward and one-reverse type, and a plurality of speed-change frictional engaging means for effecting a speed change through the selection of a gear ratio of the gear train. The speed-change frictional engaging elements include. e.g.. hydraulic clutches and hydraulic brakes.

Figure 2:
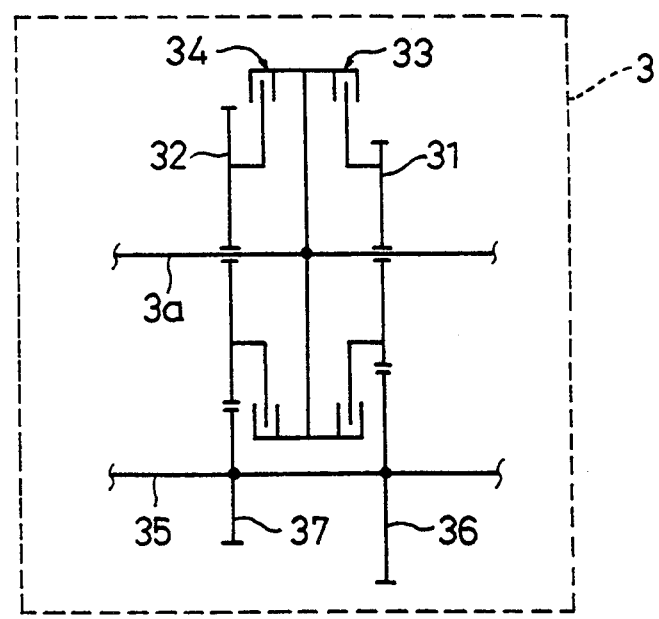
FIG. 2 is a schematic view showing the arrangement of part of a gear train in a gear transmission of FIG. 1.

FIG. 2 illustrates part of the gear transmission 3. First and second driving gear wheels 31 and 32 are rotatably disposed around a rotary shaft 3a, and hydraulic clutches 33 and 34, as the speed-change frictional engaging elements, are secured between the first driving gear wheel 31 and the rotary shaft 3a and between the second driving gear wheel 32 and the rotary shaft 3a, respectively. The driving gear wheels 31 and 32, when engaged with the clutches 33 and 34, respectively, rotate together with the rotary shaft 3a.

An intermediate transmission shaft 35 extends parallel with the rotary shaft 3a and is coupled to a drive axle via a final reduction gear, not shown. First and second driven gear wheels 36 and 37 are secured to the intermediate transmission shaft 35 and are in mesh with the driving gear wheels 31 and 32, respectively.

Thus, when the clutch 33 is in engagement with the first driving gear wheel 31, rotation of the rotary shaft 3a is transmitted to the intermediate transmission shaft 35 through the clutch 33, the first driving gear wheel 31, and the first driven gear wheel 36, thereby establishing a first speed, for example. When the clutch 34 is engaged with the second driving gear wheel 32, rotation of the rotary shaft 3a is transmitted to the Intermediate transmission shaft 35 via the clutch 34, the second driving gear wheel 32, and the second driven gear wheel 37, thereby establishing, e.g., a second speed.

When the first-speed clutch 33, which is then engaged, is disengaged while the second-speed clutch 34 is engaged, the automatic transmission 2 upshifts from the first speed to the second speed. Conversely, when the second-speed clutch 34, which is then engaged, is disengaged while the first-speed clutch 33 is engaged, the automatic transmission 2 downshifts from the second speed to the first speed.

Figure 3:
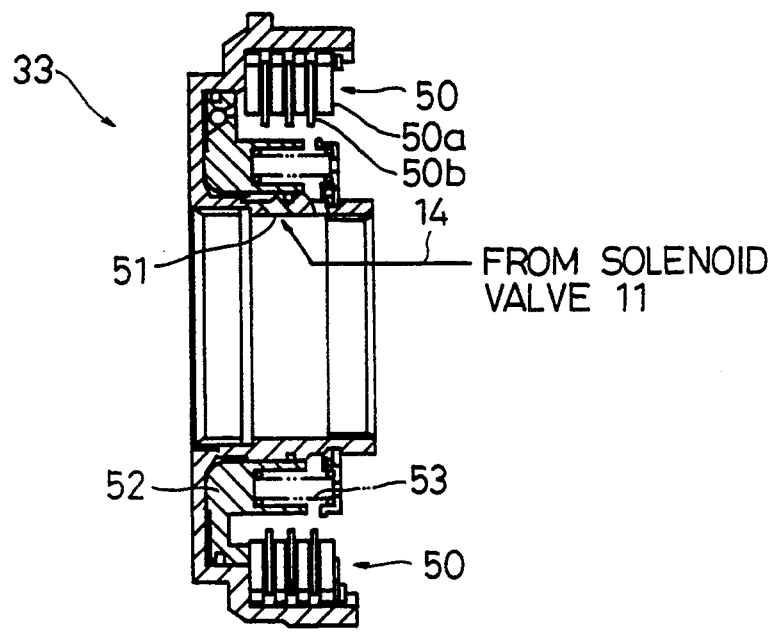
FIG. 3 is a sectional view showing a clutch of FIG. 2.

The clutches 33 and 34 each comprise a hydraulic multiple disc clutch, and a section of the first-speed clutch 33 is illustrated in FIG. 3. The clutch 33 comprises a plurality of frictional engaging plates 50 which are composed of a plurality of clutch plates (engaging plate) 50a disposed for rotation in unison with the rotary shaft 3a, and a plurality of clutch discs (engaged plate) 50b disposed for rotation in unison with the first driving gear wheel 31. When operating oil is introduced from an oil passage 14, mentioned later, into the clutch 33 through a port 51, a piston 52 moves forward to establish frictional engagement between the clutch plates 50a and the clutch discs 50b. When the piston 52 moves backward due to the action of the return spring 53, with the operating oil discharged to the oil passage 14 through the port 51, the engagement between the clutch plates 50a and the clutch discs 50b is released.

The engagement of the clutch 33 can be fully released by bringing the frictional engaging plates 50 to a standby position. In the standby position, there are enough clearances between the clutch plates 50a and the clutch discs 50b of the frictional engaging plates 50, to thereby prevent production of the so-called drag torque. Conversely, to engage the clutch 33, it is necessary to effect the so-called dead space elimination operation for moving the clutch plates 50a and the clutch discs 50b through an ineffective stroke and up to a position at which the clearances become approximately zero, that is, a position just short of the position where the frictional engagement occurs. Accordingly, the dead space elimination operation requires an ineffective time period Tf.

In releasing the engagement of the clutch 33, on the other hand, a hydraulic pressure release time is required from the start of discharge of the operating oil from the clutch 33 to the time at which a hydraulic pressure force becomes smaller than an urging force produced by the return spring 53, to thereby allow the clutch plates 50a and the clutch discs 50b to start to separate from one another.

Meanwhile the clutch 34, which has the same structure as the clutch 33, also requires a predetermined dead space elimination time Tf' and a hydraulic pressure release time TO'. Hereinafter, those elements for the clutch 34 are shown by reference numerals marked with the symbol "'".

The hydraulic circuit 5 includes duty-controlled solenoid valves (hereinafter merely referred to as "solenoid valves"), associated with the respective speed-change frictional engaging means, for actuating the corresponding frictional engaging means, i.e., clutches and brakes, independent of one another. These solenoid valves are operated in a similar manner to actuate the corresponding clutches or brakes, and therefore, only a solenoid valve 11 for operating the clutch 33 will be described with reference to FIG. 4, and a description of the solenoid valve 11' for operating the clutch 34 is omitted.

Figure 4:
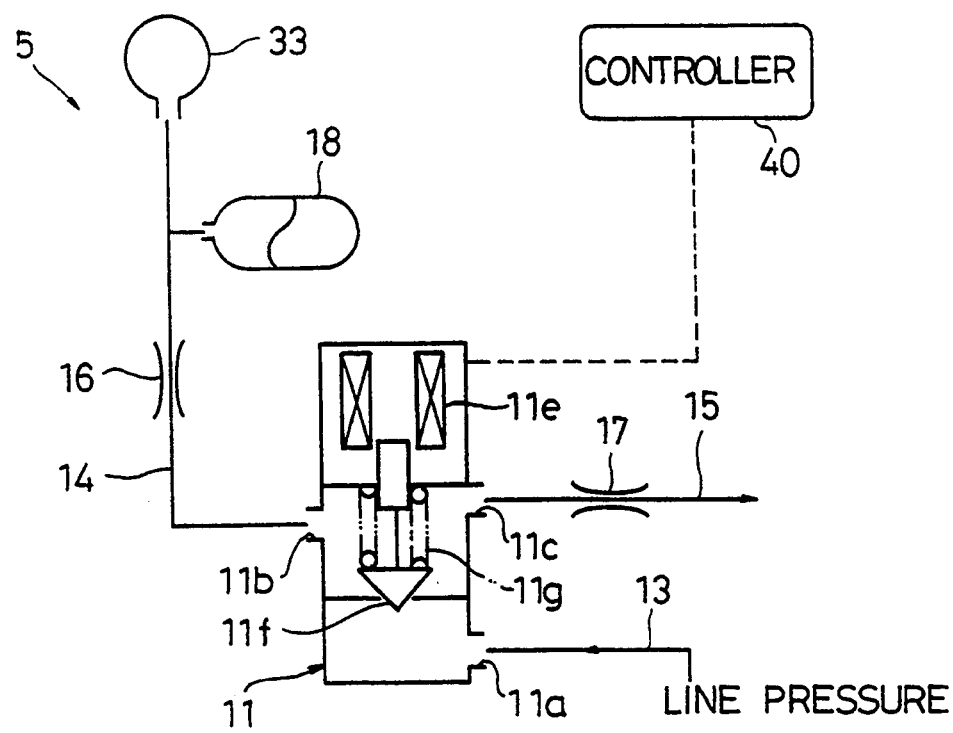
FIG. 4 is a schematic view showing the, arrangement of part of a hydraulic circuit for operating clutches shown in FIGS. 2 and 3.

FIG. 4 illustrates part of the hydraulic circuit 5 which includes the solenoid valve 11 for supplying hydraulic pressure to the clutch 33. The solenoid valve 22 is a normally-closed two-position changeover valve having three ports 11a to 11c.

The first port 11a is connected to a first oil passage 13 extending to an oil pump (not shown). A pressure regulating valve or the like, not shown, is arranged midway in the first oil passage 13, to supply operating oil of predetermined pressure (line pressure).

The second and third ports 11b and 11c are connected, respectively, to a second oil passage 14 extending to the hydraulic clutch 33, and a third oil passage 15 extending to an oil tank (not shown). Orifices 16 and 17 are provided in the middle of the second and third oil passages 14 and 15, respectively. The flow passage area of the orifice 16 in the second oil passage 14 is greater than that of the orifice 17 provided in the third oil passage 15. An accumulator 18 is arranged in the second oil passage 14 between the clutch 33 and the orifice 16.

The solenoid valve 11 is electrically connected to the controller 40 and is subjected to duty-factor control at intervals of a predetermined cycle. When a solenoid 11e of the solenoid valve 11e de-energized, a valve plug 11f is urged by a return spring 11g, whereby the communication between the first and second ports 11a and 11b is blocked. When the solenoid 11e is energized, the valve plug 11f lifts against the force of the return spring 11g, whereby the first and second ports 11a and 11b are connected with each other. The second port 11b and the third port 11c are always in communication with each other.

The controller 40 includes therein memories such as a ROM and a RAM, a central processing unit, input/output devices, counters, etc., none of which are shown. Various sensors such as an Nt sensor 21, an No sensor 22, a $\theta$ t sensor 23, etc., are electrically connected to the input side of the controller 40.

The Nt sensor 21 is a turbine speed sensor for detecting the rotational speed Nt of the turbine of the torque converter 4 (i.e., the input shaft of the automatic transmission 2), and the No sensor 22 is a transfer drive gear speed sensor for detecting the rotational speed No of a transfer drive gear (i.e., the output shaft of the automatic transmission 2), not shown. The controller 40 calculates a vehicle speed V based on the rotational speed No. The $\theta$ t sensor 23 is a throttle opening sensor for detecting the opening $\theta$ t of a throttle valve arranged in an intake passage, not shown, of the engine 1. These sensors 21 to 23 supply detection signals to the controller 40 at predetermined intervals of time.

The controller 40 causes the automatic transmission 2 to perform a gear change operation or shift change in accordance with control procedures stored in the memory. More specifically, the controller 40 continuously monitors signals supplied from the Nt sensor 21, No sensor 22, $\theta$ sensor 23, etc., and discriminates a gear suited for the running state of the vehicle based on these signals. If it is concluded that upshifting, e.g., from the first speed to the second should be made, the controller 40 performs the changeover operation between the first-speed clutch 33 and the second-speed clutch 34, to thereby effect the upshift.

Figure 5:
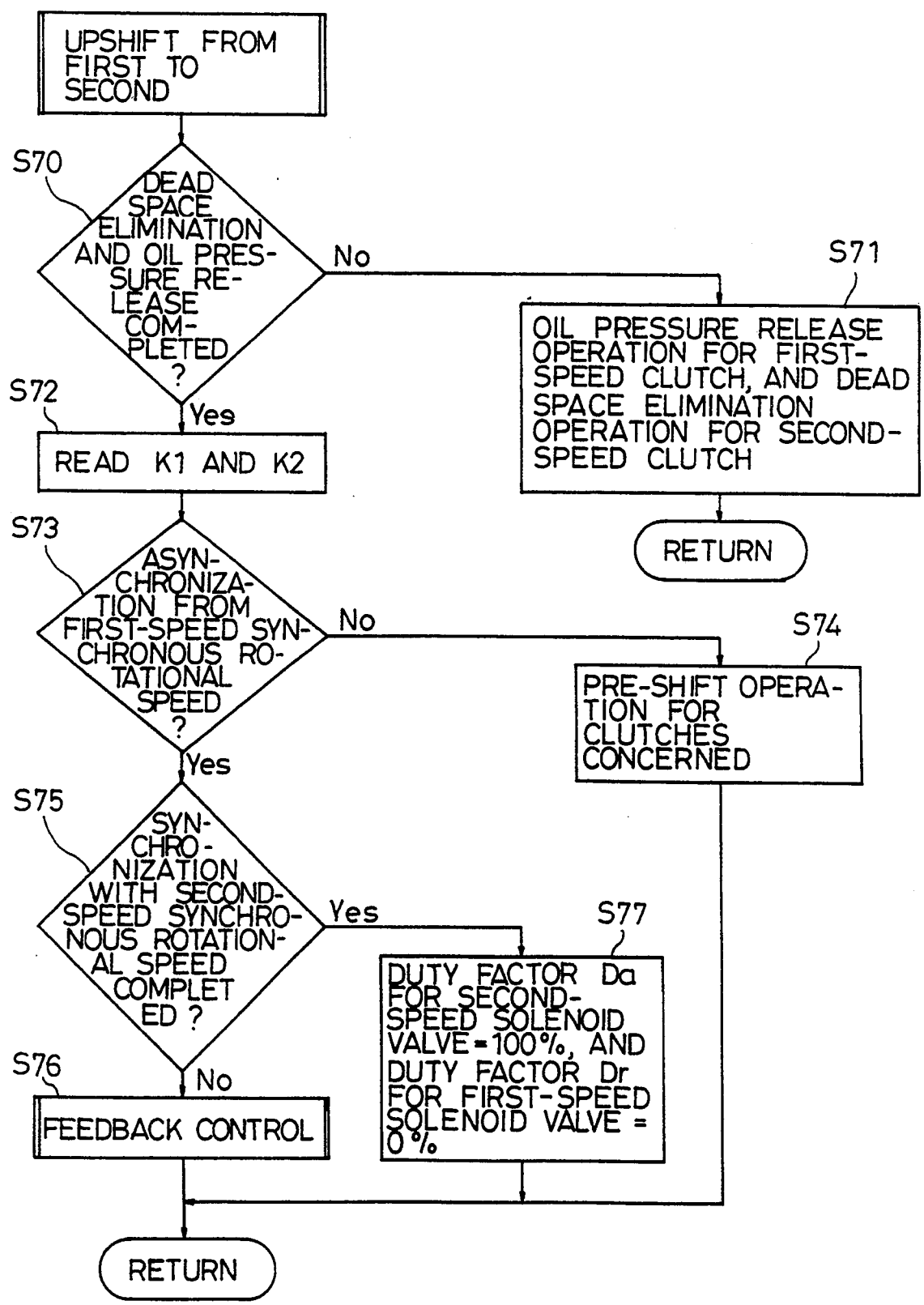
FIG. 5 is a flowchart showing procedures for upshift control from first to second, executed by a controller shown in FIG. 1.
Figure 6:
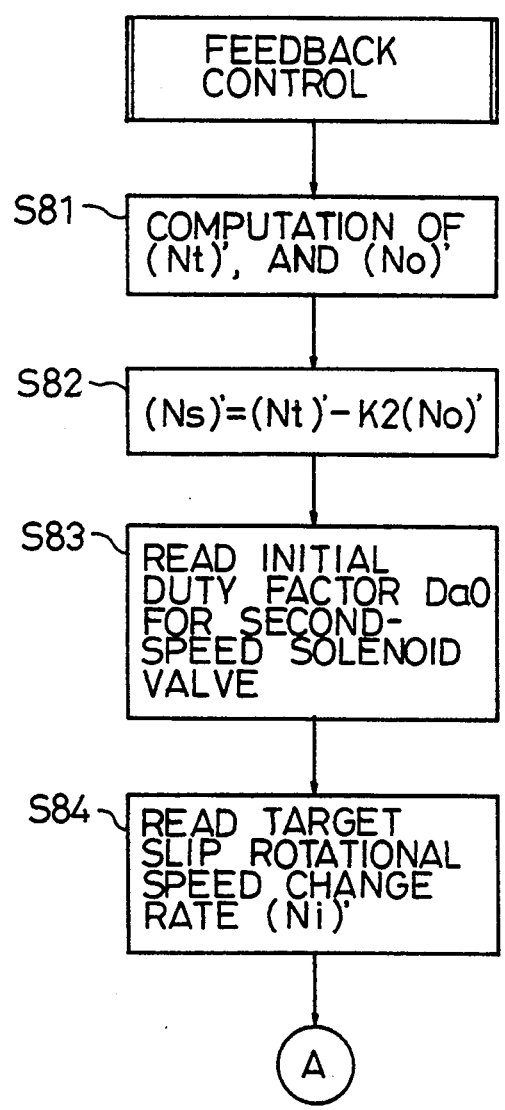
FIG. 6 is part of a feedback control subroutine executed in Step S76 of FIG. 5.
Figure 7:
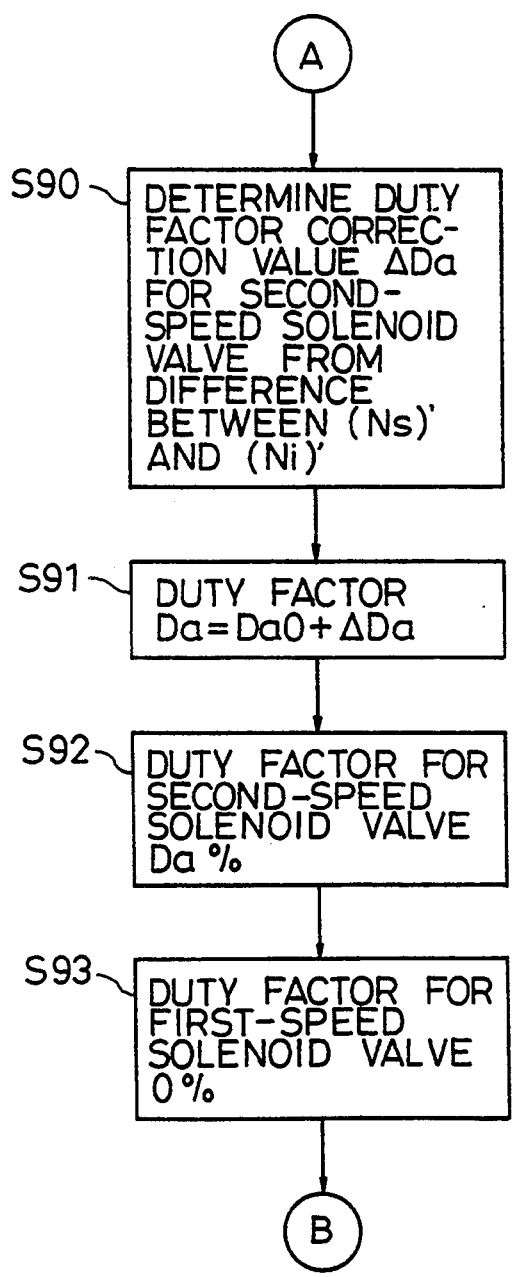
FIG. 7 is a flowchart which follows FIG. 6.

With reference to FIGS. 5-7 together with FIG. 8, a speed change control procedure for upshift from first to second during an accelerative running state of a vehicle will be described. A main routine for upshift control shown in FIG. 5 is repeatedly executed with a predetermined period until the upshift is completed, when the necessity of upshift is recognized by the controller 40.

First, in Step S70 of FIG. 5, the controller 40 discriminates whether or not the hydraulic pressure release for the first-speed clutch 33 and the dead space elimination operation for the second-speed clutch 34 are completed. If the decision in this step is negative, the program proceeds to Step S71 wherein the controller 40 releases the engagement of the first-speed clutch 33 (causes discharge of hydraulic pressure), and effects the dead space elimination operation. Thereupon, the execution of the main routine is finished.

More specifically, the solenoid valve 11 for controlling the first-speed clutch 33 is driven with a duty factor of 0% so that hydraulic pressure is rapidly released from the clutch 33 while the solenoid valve 11' for controlling the second-speed clutch 34 is driven at with a duty factor of 100% so that full pressure is supplied to the clutch 34.

Thereafter, the controller 40 repeatedly executes the main routine, so as to effect and complete the disengagement of the first-speed clutch 33 and the dead space elimination operation of the second-speed clutch 34.

Upon completion of the disengagement of the first-speed clutch 33 and the dead space elimination operation of the second-speed clutch 34, the discrimination conditions at Step S70 are satisfied, so that the program proceeds from Step S70 to Step S72.

At Step S72, the controller 40 reads a gear ratio K1 associated with the first speed or first gear and a gear ratio K2 associated with the second speed from the memory. The gear ratio K1 is employed for determining a first-speed synchronous rotational speed, mentioned later, by multiplying a rotational speed No of the output shaft by the gear ratio K1. The gear ratio K2 is employed for determining a second-speed synchronous rotational speed, mentioned later, by multiplying the output shaft rotational speed No by the gear ratio K2.

Next, the program proceeds to Step S78 wherein the controller 40 determines whether or not the rotational speed Nt of the turbine comes off the first-speed synchronous rotational speed N1. Specifically, the controller 40 obtains the product of the output shaft rotational speed No and the gear ratio K1, obtains the absolute value of the difference between the resultant product and the turbine rotational speed Nt, and determines whether or not this absolute value exceeds 50 rpm ($|Nt - K1 \times No| > 50$ rpm).

Immediately after the disengagement of the first-speed clutch 33 and the dead space elimination operation for the second-speed clutch 34 are completed, the decision in Step S73 is negative, so that the program proceeds to Step S74 wherein the controller 40 executes a pre-shift operation for the first- and second-speed clutches 33 and 34 in accordance with a predetermined procedure.

Here, a brief explanation of the pre-shift operation is given. After completion of the dead space elimination operation of the second-speed clutch 34, the second-speed solenoid valve 11' is driven with a predetermined duty factor until a asynchronous state with respect to the first-speed synchronous rotational speed is detected, so as to hold the piston at a position assumed by the position upon completion of the dead space elimination operation. The first-speed solenoid valve 11 is driven with a predetermined duty factor, so that the piston is held at a position just short of the position at which torque transmission through the first-speed clutch 33 is started.

Then, the controller 40 repeatedly executes the process of Step S74 until it is concluded in Step S73 that the turbine rotational speed Nt is asynchronous with the first-speed synchronous rotational speed N1.

The turbine rotational speed Nt in this state is regarded as being the same as the first-speed synchronous rotational speed N1. The turbine rotational speed Nt changes as shown in FIG. 8 when the vehicle is in an accelerative running state, and changes as shown in FIG. 9 in a decelerative running state.

If the decision in Step S73 is positive, that is, if it is concluded that the turbine rotational speed Nt is asynchronous with the first-speed synchronous rotational speed N1 (T1 in FIG. 8), on the other hand, the program proceeds to Step S75 wherein the controller 40 determines whether or not the turbine rotational speed Nt has attained the second-speed synchronous rotational speed N2.

Specifically, the controller 40 obtains the product of the output shaft rotational speed No and the gear ratio K2, further obtains the absolute value of the difference between the resulting product and the turbine rotational speed Nt, and determines whether or not this absolute value is not larger than the predetermined decision value (e.g., 50 rpm) ($|\uparrow Nt - K2 \times No| \leq 50$ rpm).

Immediately after the turbine rotational speed Nt becomes asynchronous with the first-speed synchronous rotational speed N1, the decision in Step S75 is negative, so that the program proceeds to Step S76 wherein the controller 40 executes a subroutine for feedback control shown in FIGS. 6 and 7, thereby effecting feedback control of the turbine rotational speed Nt.

At Step S81 of FIG. 6, the controller 40 first obtains the turbine rotational speed changing rate (Nt)', a time differential of the turbine rotational speed Nt, on the basis of the turbine rotational speed Nt previously detected and the rotational speed Nt currently detected, and then obtains the output shaft rotational speed changing rate (No)', a time differential of the output shaft rotational speed No, on the basis of the output shaft rotational speed No detected previously and the rotational speed No currently detected. The symbols (Nt)' and (No)' respectively represent the time differentials of the rotational speeds Nt and No. Other time differentials will be represented in a similar manner.

Thereafter, at Step S82, the controller 40 subtracts the product of the output shaft rotational speed changing rate (No)' and the gear ratio K2 from the turbine rotational speed changing rate (Nt)40, thereby obtaining an actual slip rotational speed changing rate (Ns)' (=(Nt)'−K2(No)'). The slip rotational speed changing rate (Ns)', which represents the time-based changing rate of the difference in rotational speed between the clutch plates 50a' and clutch disks 50b' of the second-speed clutch 34, is represented as a function of the product of the rate (No)' and the gear ratio K2 which product reflects influence of a change in vehicle speed. Accordingly, it is possible to complete a speed change operation in a desired speed change time period even if the vehicle is in an accelerative or decelerative running state.

If the vehicle is in a constant-speed running state wherein the rate (No)' is zero, it seems that the speed change control cannot be achieved by the present invention. Actually, however, the rate (No)' hardly becomes just zero, and thus it is possible to effect the speed change control. If the vehicle is in an accelerative or decelerative running state wherein the rate (No)' is large, the speed change control produces remarkable effects.

Then, the program proceeds to Step S83 wherein the controller 40 reads the initial duty factor Da0 for the second-speed solenoid valve 11'. Further, the program proceeds to Step S84 wherein the controller reads a target slip rotational speed changing rate (Ni)'. The initial duty factor Da0 is an optimum duty factor for start of feedback. The initial duty factor Da0 and the target slip rotational speed changing rate (Ni)' are set beforehand in a manner respectively corresponding to various modes, which include upshift from first to second and from second to third, etc., downshift from second to first and from third to second, etc., and a power on/off state. Moreover, the duty factor and the changing rate may be corrected in accordance with the vehicle running state which is represented by the vehicle speed, throttle opening, A/N, etc.

Thereafter, the program proceeds to Step S90 of FIG. 5 wherein the controller 40 obtains the duty factor correction value ΔDa for the second-speed solenoid valve 11' on the basis of the difference between the actual slip rotational speed changing rate (Ns)' and the target slip rotational speed changing rate (Ni)'. A method of computing the correction value ΔDa is not specifically limited, and various computation methods used for the conventional PID control may be applied to the computation. Then, the program proceeds to Step S91 wherein the correction value ΔDa is added to the initial duty factor Da0, and the resulting sum is set as a current duty factor Da.

Next, the controller 40 drives the second-speed solenoid valve 11' with the duty factor Da (=Da0+ΔDa), at Step S92, and delivers an output to drive the first-speed solenoid valve 11 with the duty factor of 0%, at Step S93, whereby feedback control is effected such that the slip rotational speed changing rate (Ns)' becomes equal to the target slip rotational speed changing rate (N1)'.

The controller 40 repeatedly executes the main routine of FIG. 5 including Step S76 at which the subroutine shown in FIGS. 6 and 7 is executed, thereby continuing the feedback control so as to bring the slip rotational speed changing rate (Ns)' to be equal to the target slip rotational speed changing rate (Ni)'.

If the decision in Step S75 becomes positive as the feedback control is advanced, the controller 40 determines that the turbine rotational speed Nt is synchronized with the second-speed synchronous rotational speed N2 (T2 of FIG. 8), so that the program proceeds to Step S77.

Figure 8:
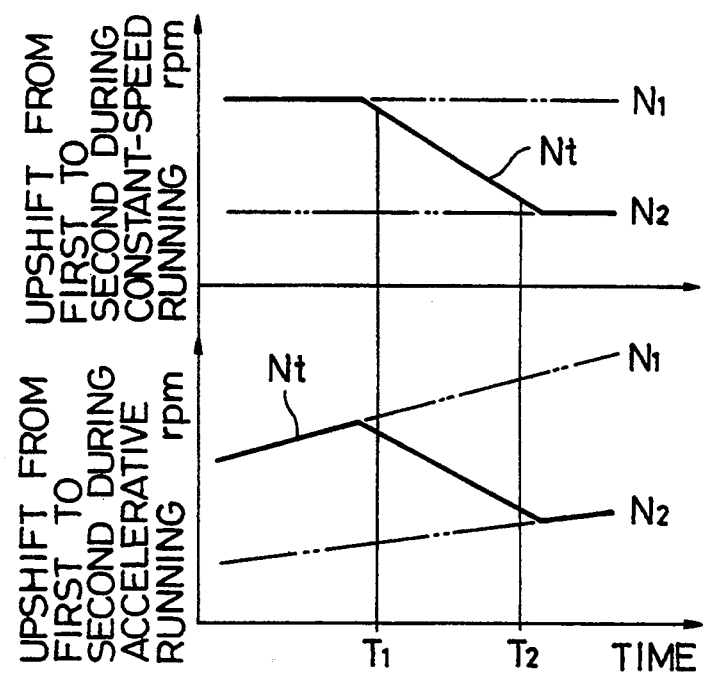
FIG. 8 is a view showing a time-dependent change in turbine rotational speed Nt in a case where upshift from first to second is carried out by means of the speed change control method of the present invention.
Figure 9:
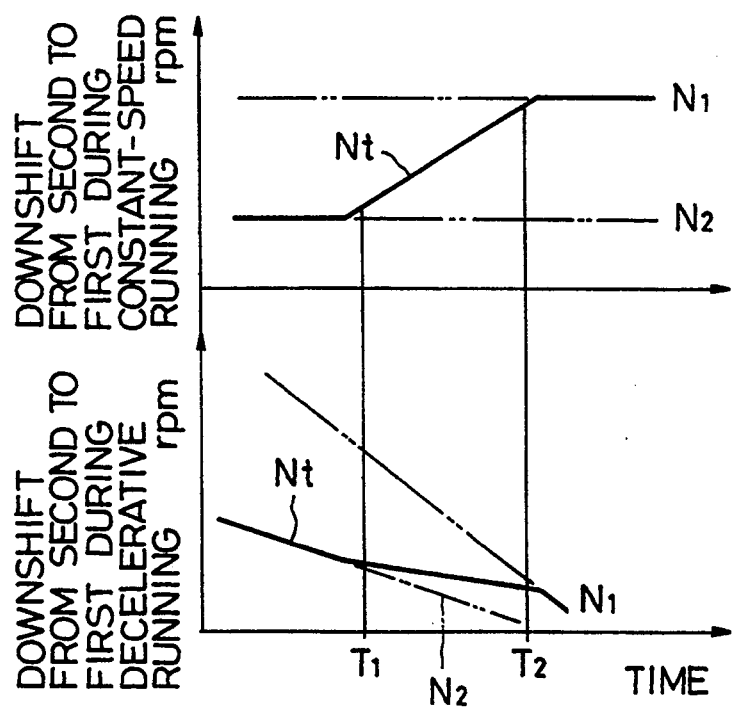
FIG. 9 is a view showing a time-dependent change in turbine rotational speed Nt in a case where downshift from second to first is carried out by the speed change control method of the present invention.
Figure 10:
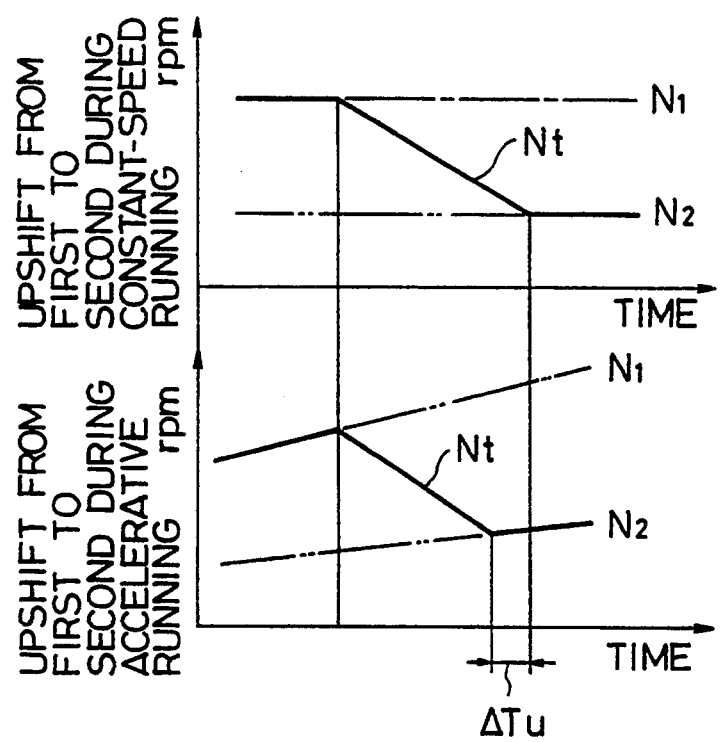
FIG. 10 is a view showing a time-dependent change in turbine rotational speed Nt in a case where upshift from first to second is carried out by means of a conventional speed change control method.
Figure 11:
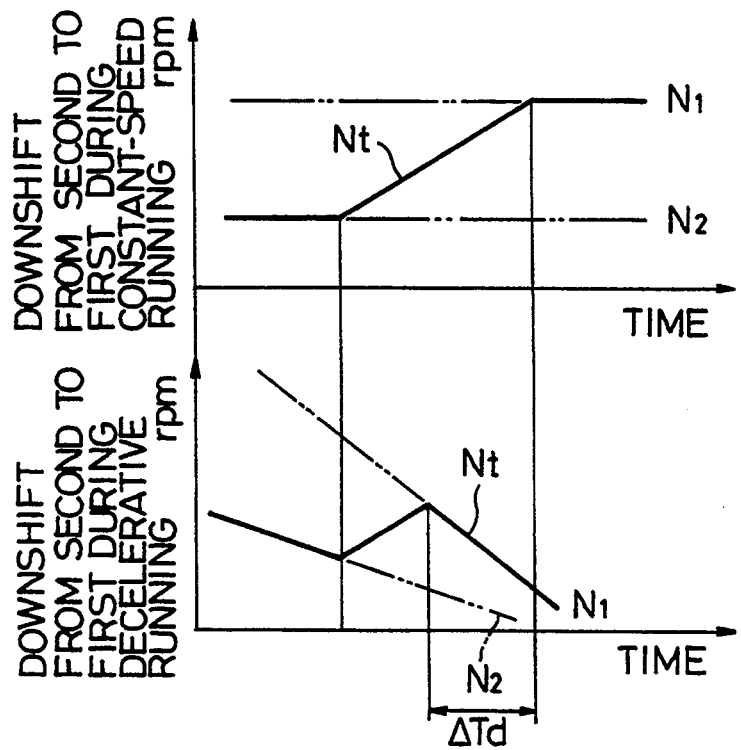
FIG. 11 is a view showing a time-dependent change in turbine rotational speed Nt in a case where downshift from second to first is carried out by the conventional speed change control method.

As apparent from FIG. 8, a time period required for the turbine rotational speed Nt to become synchronized with the second-speed synchronous rotation rate N2, i.e., time (T2−T1), is substantially constant between a case wherein the second-speed synchronous rotational speed N2 is substantially constant when the vehicle runs at constant speed and a case wherein the rotational speed N2 increases when the vehicle runs in an accelerative state.

The reason for this is that the slip rotational speed changing rate can be considered as being a relative amount between the input-side of the friction element and the output-side thereof at which a change in the vehicle speed is reflected. That is, if the slip rotational speed changing rate for constant-speed running of the vehicle is stored as the target slip rotational speed changing rate, the clutch 34 is controlled such that the rotational speed changing rate between the engaging-side (clutch plates 50a') and engaged-side (clutch discs 50b') of the clutch 34 becomes equal to the target value, even when the synchronous rotational speed increases due to the accelerative running of the vehicle, for instance. This makes it possible to complete speed change in the same speed change time period, as compared with a case wherein the vehicle runs at constant speed.

(Meanwhile, according to tile conventional feedback in which the input shaft rotational speed changing rate is controlled to a target value, the aforementioned problem is found since the input shaft rotational speed is controlled such that its changing rate is always equal to the target value even when the synchronous rotational speed changes, if the input shaft rotational speed changing rate for constant-speed running is stored as the target value.)

At Step S77, the controller 40 sets the duty factors Da and Dr of the second- and first-speed solenoid valves 11' and 11 at 100% and 0%, respectively, and delivers the same. Thus, the second-speed clutch 34 is fully engaged, and the first-speed clutch 33 is entirely disengaged, whereby the upshift of the automatic transmission 2 from first to second is finished.

After executing the aforesaid process of Step S77, the controller 40 finishes the main routine, whereupon it postpones the execution of the main routine, and stands by until it recognizes the necessity of the next shift change.

In the embodiment, the case where upshifting from first to second is effected in the automatic transmission 2 has been explained. However, the present invention is not limited to this upshift mode. Upshifting from second to third, etc. can be carried out in the same manner. Also, downshift in the automatic transmission 2 can be carried out in a similar manner. In this case, a time period required for speed change, i.e., time (T2−T1), for the decelerative running state is substantially equal to that for the constant-speed running state, as shown in FIG. 9.

Moreover, in the embodiment, the second-seed clutch 34 is feedback-controlled. However, the first-speed clutch 33 may be feedback-controlled, as in the aforesaid case, in dependence on power on/off state of the engine 1.

From the above-described embodiment of the present invention, it is apparent that the present invention may be modified as would occur to one of ordinary skill in the art without departing from the spirit and scope of the present invention which should be defined solely by the appended claims. All such modifications as would be obvious to one of ordinary skill in the art should not be regarded as a departure from the spirit and scope of the invention, and should be included within the scope of the invention as defined solely by the appended claims.

What is claimed is:

1. A speed change control method of an automotive automatic transmission, the automotive automatic transmission including a first frictional engaging element for establishing a first gear stage, a second frictional engaging element for establishing a second gear stage, a first electromagnetic valve for controlling an operating oil pressure supplied to the first frictional engaging element, and a second electromagnetic valve for controlling an operating oil pressure supplied to the second fractional engaging element, the method controlling the first and second electromagnetic valves such that the first frictional engaging element having been engaged is released and the second frictional engaging element having been released is engaged, to carry out gear-changing from the first gear stage to the second gear stage, said speed change control method comprising the steps of:

detecting a rotational speed of an input shaft of the automatic transmission;

detecting a rotational speed of an output shaft of the automatic transmission;

detecting, as a slip rotational speed change rate, a difference between a change rate of the input shaft rotational speed and a product, calculated by multiplying a change rate of the output shaft rotational speed by a gear ratio associated with the second gear stage; and carrying out feedback control of the second electromagnetic valve such that the slip rotational speed change rate becomes equal to a target value.

2. The speed change control method of claim 1, further including of:

detecting, as an asynchronous point, a time point at which the input shaft rotational speed of the automatic transmission starts to be deviated from a rotational speed corresponding to the first gear stage;

detecting, as a synchronous point, a time point at which the input shaft rotational speed has reached a rotational speed to be achieved in the second gear stage; and carrying out the feedback control from the asynchronous point to the synchronous point.

3. The speed change control method of claim 2, further including the steps of:

detecting, as a first product, a product of the output shaft rotational speed and a gear ratio associated with the first gear stage;

detecting, as a second product, a product of the output shaft rotational speed and the gear ratio associated with the second gear stage;

detecting, as the asynchronous point, a time point at which a difference between the input shaft rotational speed and the first product becomes greater than a predetermined value; and detecting, as the synchronous point, a time point at which a difference between the input shaft rotational speed and the second product becomes at most equal to a predetermined value.

4. The speed change control method according to claim 2, further including the steps of:

setting an initial duty factor with which the second electromagnetic valve is driven, when the asynchronous point is detected; and correcting the initial duty factor in accordance with a difference between the slip rotational speed change rate and the target value.

5. The speed change control method of claim 1, further including the step of:

setting the target value for each of a plurality of speed change modes of the automatic transmission.

6. The speed change control method of claim 1, further including the step of:

correcting the target value in accordance with a running state of the vehicle.

7. A speed change control apparatus of an automotive automatic transmission, the automotive automatic transmission including a first frictional engaging element for establishing a first gear stage, a second frictional engaging element for establishing a second gear stage, a first electromagnetic valve for controlling an operating oil pressure supplied to the first frictional engaging element, and a second electromagnetic valve for controlling an operating oil pressure supplied to the second frictional engaging element, the speed change control apparatus being operable to control the first and second electromagnetic valves such that the first frictional engaging element having been engaged is released and the second frictional engaging element having been released is engaged, to carry out gear-changing from the first gear stage to the second gear stage, said speed change control apparatus comprising:

input shaft rotational speed detecting means for detecting a rotational speed of an input shaft of the automatic transmission;

output shaft rotational speed detecting means for detecting a rotational speed of an output shaft of the automatic transmission;

input shaft rotational speed change rate detecting means for detecting a change rate of the rotational speed of the input shaft based on the rotational speed of the input shaft detected by said input shaft rotational speed detecting means;

output shaft rotational speed change rate detecting means for detecting a change rate of the rotational speed of the output shaft based on the rotational speed of the output shaft detected by said output shaft rotational speed detecting means;

calculating means for multiplying the change rate of the rotational speed of the output shaft by a gear ratio associated with the second gear stage, to calculate a product;

slip rotational speed change rate detecting means for detecting, as a change rate of a slip rotational speed, a difference between the change rate of the input shaft rotational speed and the calculated product;

storing means for storing a target value of the change rate of the slip rotational speed; and feedback control means for carrying out feedback control of at least one of the first electromagnetic valve and the second electromagnetic valve such that the change rate of the slip rotational speed becomes equal to the target value.

8. The speed change control apparatus of claim 7, wherein the target value for each of a plurality of speed change modes of the automatic transmission is set.

9. The speed change control apparatus of claim 7, wherein the target value is corrected in accordance with a running state of a vehicle.

10. A speed change control apparatus of an automotive automatic transmission, the automotive automatic transmission including a first frictional engaging element for establishing a first gear stage, a second frictional engaging element for establishing a second gear stage, a first electromagnetic valve for controlling an operating oil pressure supplied to the first frictional engaging element, and a second electromagnetic valve for controlling an operating oil pressure supplied to the second frictional engaging element, the speed change control apparatus being operable to control the first and second electromagnetic valves such that the first frictional engaging element having been engaged is released and the second frictional engaging element having been released is engaged, to carry out gear-changing from the first gear stage to the second gear stage, said speed change control apparatus comprising:

input shaft rotational speed detecting means for detecting a rotational speed of an input shaft of the automatic transmission;

output shaft rotational speed detecting means for detecting a rotational speed of an output shaft of the automatic transmission;

input shaft rotational speed change rate detecting means for detecting a change rate of the rotational speed of the input shaft based on the rotational speed of the input shaft detected by said input shaft rotational speed detecting means;

output shaft rotational speed change rate detecting means for detecting a change rate of the rotational speed of the output shaft based on the rotational speed of the output shaft detected by said output shaft rotational speed detecting means;

calculating means for multiplying the change rate of the rotational speed of the output shaft by a gear ratio associated with the second gear stage, to calculate a product;

slip rotational speed change rate detecting means for detecting, as a change rate of a slip rotational speed, a difference between the change rate of the input shaft rotational speed and the calculated product;

storing means for storing a target value of the change rate of the slip rotational speed;

asynchronous point detecting means for detecting, as an asynchronous point, a time point at which the input shaft rotational speed of the automatic transmission starts to be deviated from a rotational speed corresponding to the first gear stage;

synchronous point detecting means for detecting, as a synchronous point, a time point at which the input shaft rotational speed has reached a rotational speed to be achieved in the second gear stage; and feedback control means for carrying out feedback control of at least one of the first electromagnetic valve and the second electromagnetic valve, from the asynchronous point to the synchronous point, such that the change rate of the slip rotational speed becomes equal to the target value.

11. The speed change control apparatus of claim 10, wherein the target value for each of a plurality of speed change modes of the automatic transmission is set.

12. The speed change control apparatus of claim 10, wherein the target value is corrected in accordance with a running state of a vehicle.

* * * * *